US011380929B2

(12) United States Patent
Toda

(10) Patent No.: US 11,380,929 B2
(45) Date of Patent: Jul. 5, 2022

(54) FUEL CELL SYSTEM AND CONTROL METHOD THEREOF

(71) Applicant: HONDA MOTOR CO., LTD., Tokyo (JP)

(72) Inventor: Shigeru Toda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 616 days.

(21) Appl. No.: 16/445,837

(22) Filed: Jun. 19, 2019

(65) Prior Publication Data

US 2019/0393537 A1 Dec. 26, 2019

(30) Foreign Application Priority Data

Jun. 21, 2018 (JP) .............................. JP2018-117519

(51) Int. Cl.
| | |
|---|---|
| H01M 8/2475 | (2016.01) |
| H01M 8/0432 | (2016.01) |
| H01M 8/0213 | (2016.01) |
| H01M 8/0226 | (2016.01) |

(52) U.S. Cl.
CPC ....... *H01M 8/2475* (2013.01); *H01M 8/0213* (2013.01); *H01M 8/0226* (2013.01); *H01M 8/0432* (2013.01)

(58) Field of Classification Search
None
See application file for complete search history.

(56) References Cited

U.S. PATENT DOCUMENTS

| | | | |
|---|---|---|---|
| 7,192,458 B1 | 3/2007 | Harness et al. | |
| 2003/0211025 A1* | 11/2003 | Blommel | B01J 8/0278 422/600 |
| 2007/0101647 A1* | 5/2007 | Miyauchi | H01M 8/0612 48/127.9 |
| 2017/0288246 A1 | 10/2017 | Mizuno et al. | |

FOREIGN PATENT DOCUMENTS

| | | |
|---|---|---|
| JP | 2003-022835 | 1/2003 |
| JP | 2017-183249 | 10/2017 |

OTHER PUBLICATIONS

Japanese Office Action dated Nov. 24, 2021, English translation included, 4 pages.
European Search Report dated Oct. 31, 2019, 8 pages.

* cited by examiner

*Primary Examiner* — Christopher P Domone
(74) *Attorney, Agent, or Firm* — Rankin, Hill & Clark LLP

(57) ABSTRACT

A fuel cell system includes: a partial oxidation reformer; a fuel cell stack; a CO sensor configured to detect a CO concentration in a fuel gas produced in the partial oxidation reformer and introduced into the fuel cell stack; a mixing ratio adjusting unit configured to adjust a mixing ratio of a raw fuel and air supplied to the partial oxidation reformer; a target CO concentration setting unit configured to set a target CO concentration in the fuel gas introduced into the fuel cell stack; and a mixing control unit configured to control operation of the mixing ratio adjusting unit such that the CO concentration detected by the CO sensor becomes the target CO concentration.

8 Claims, 8 Drawing Sheets

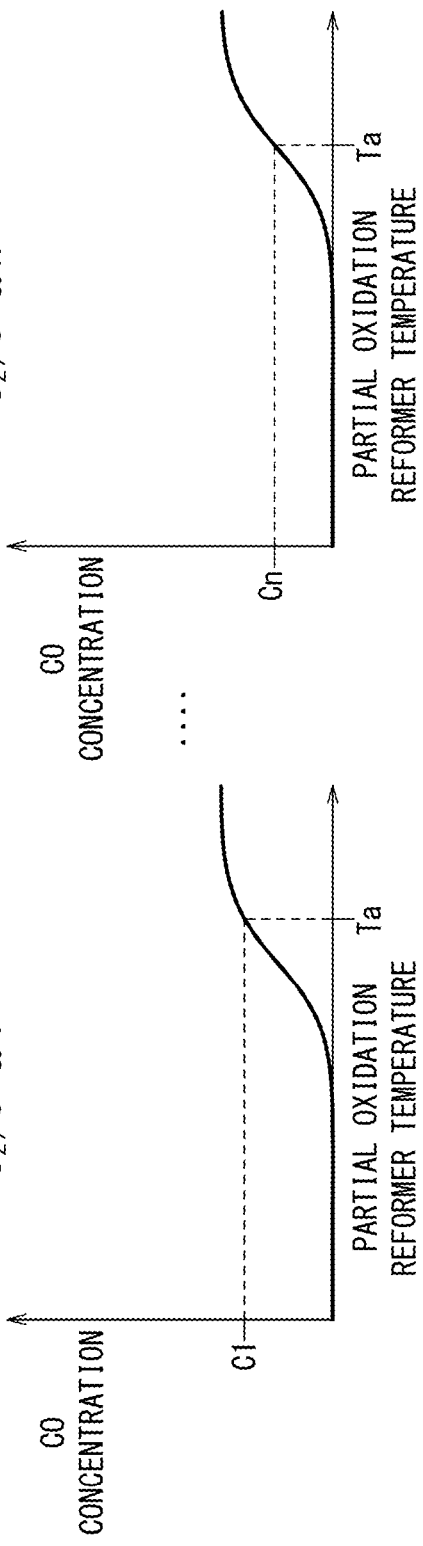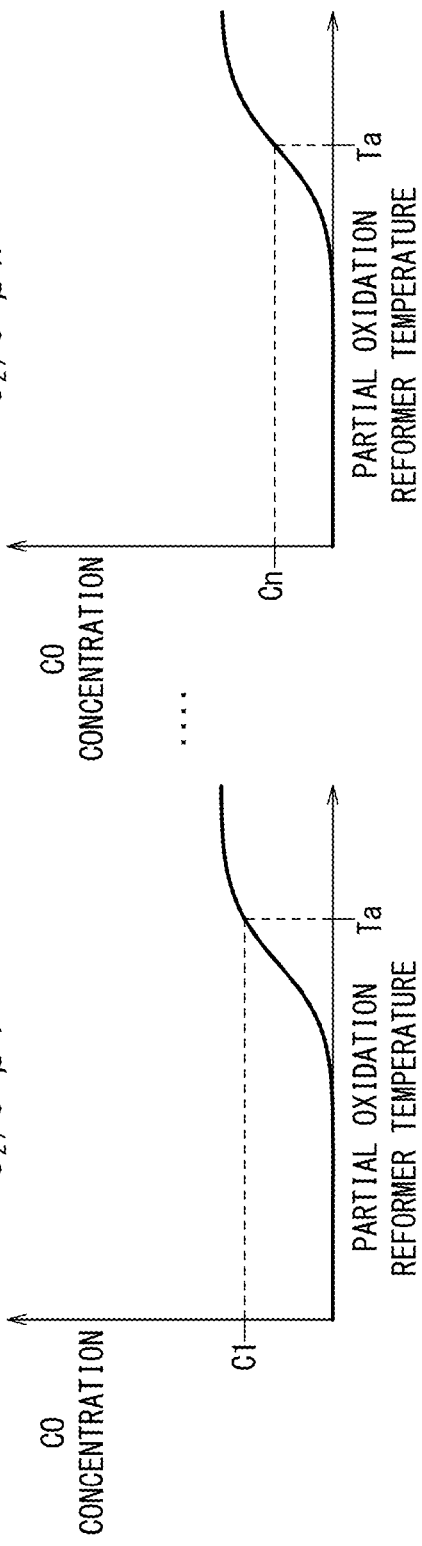

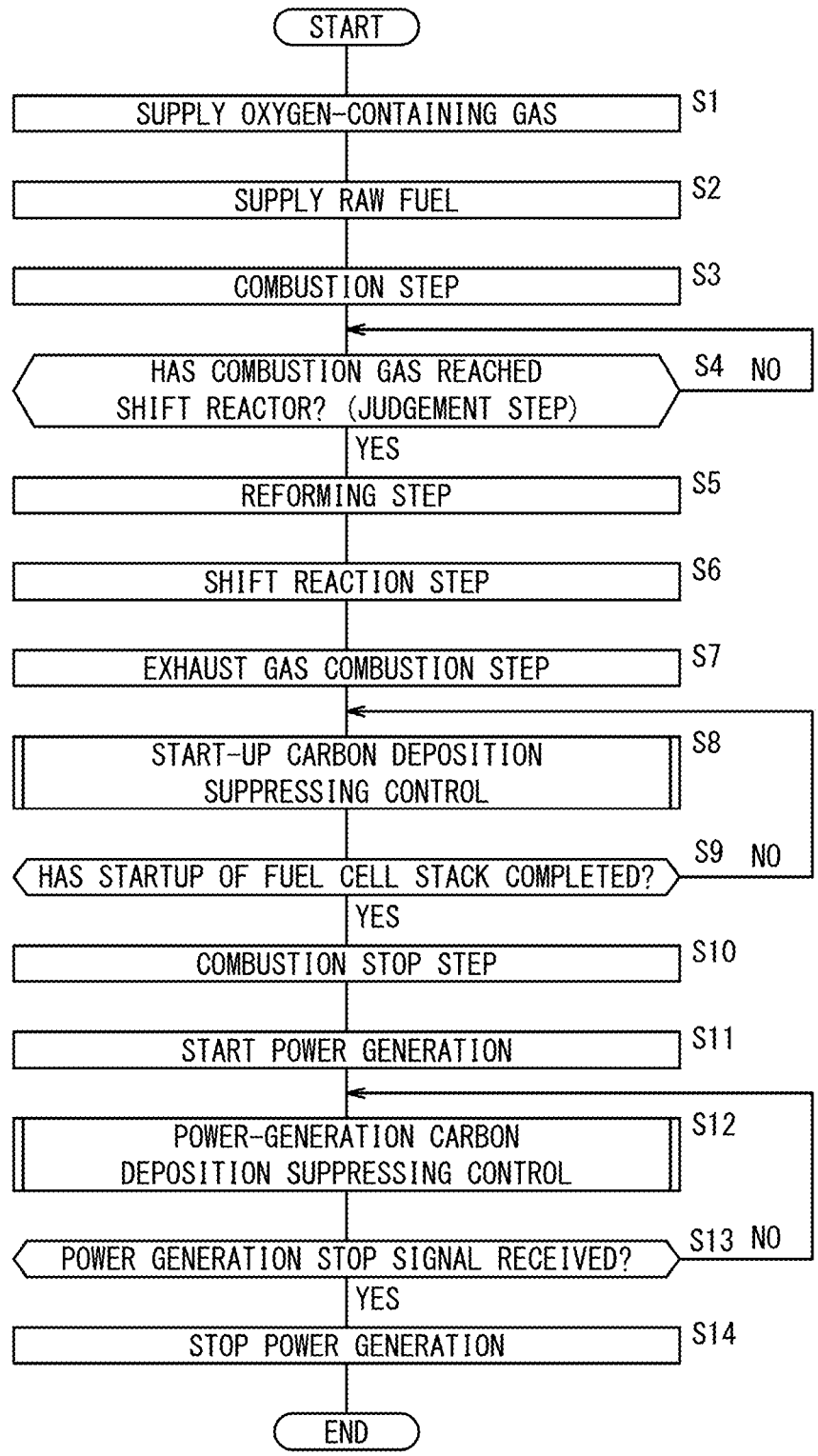

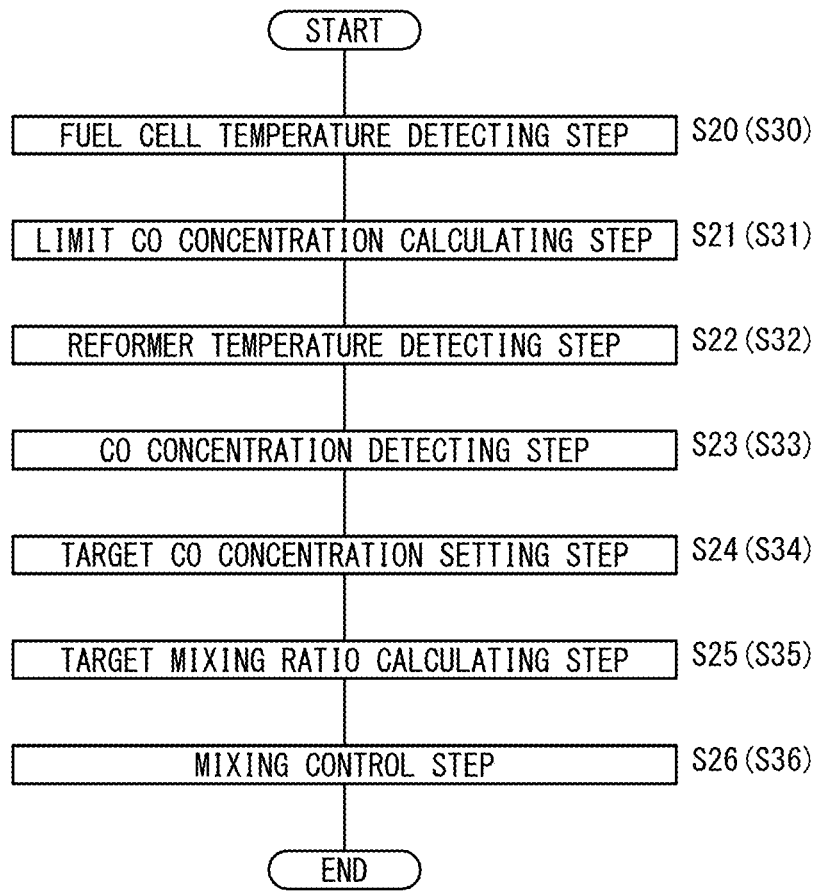

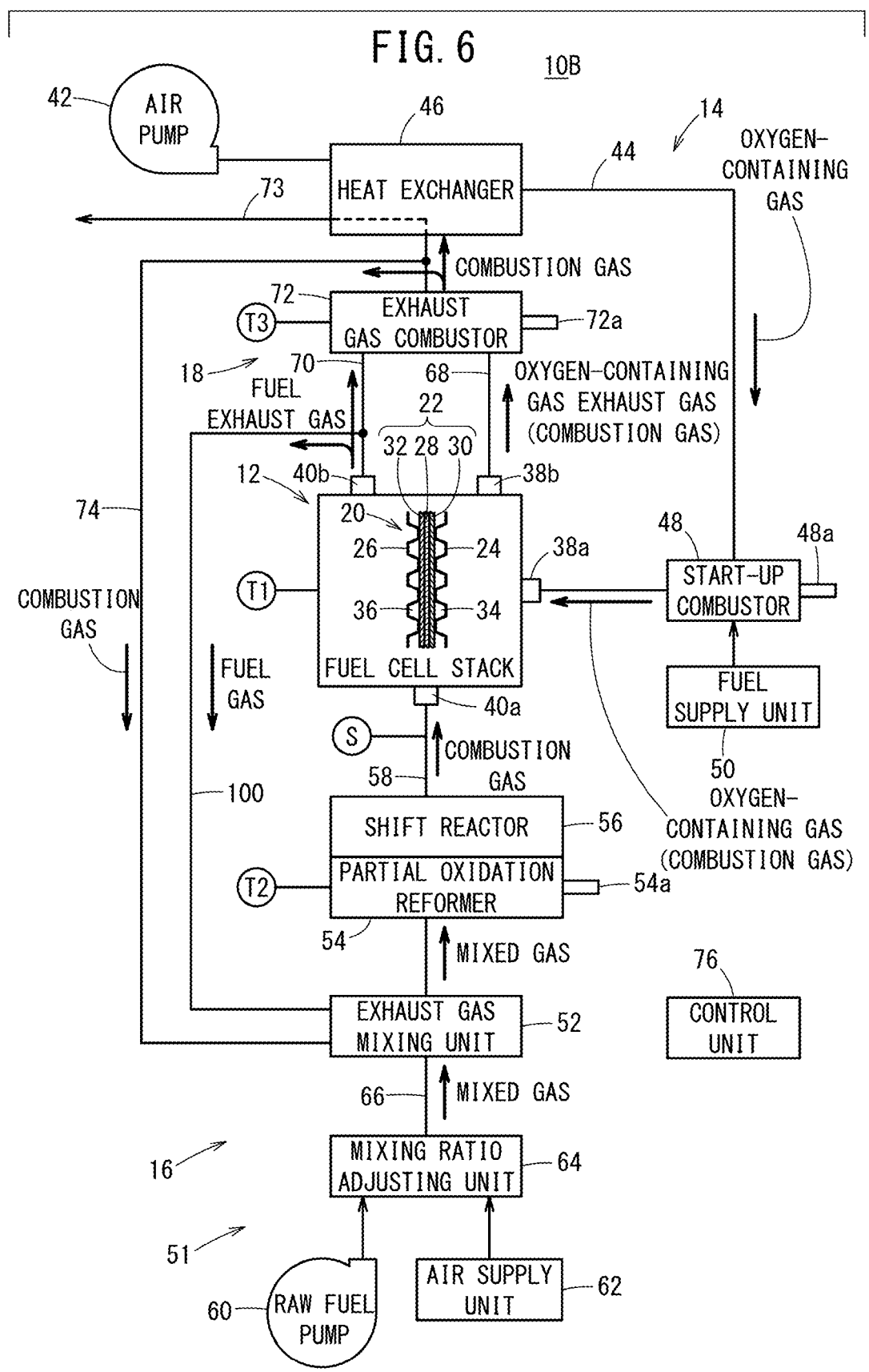

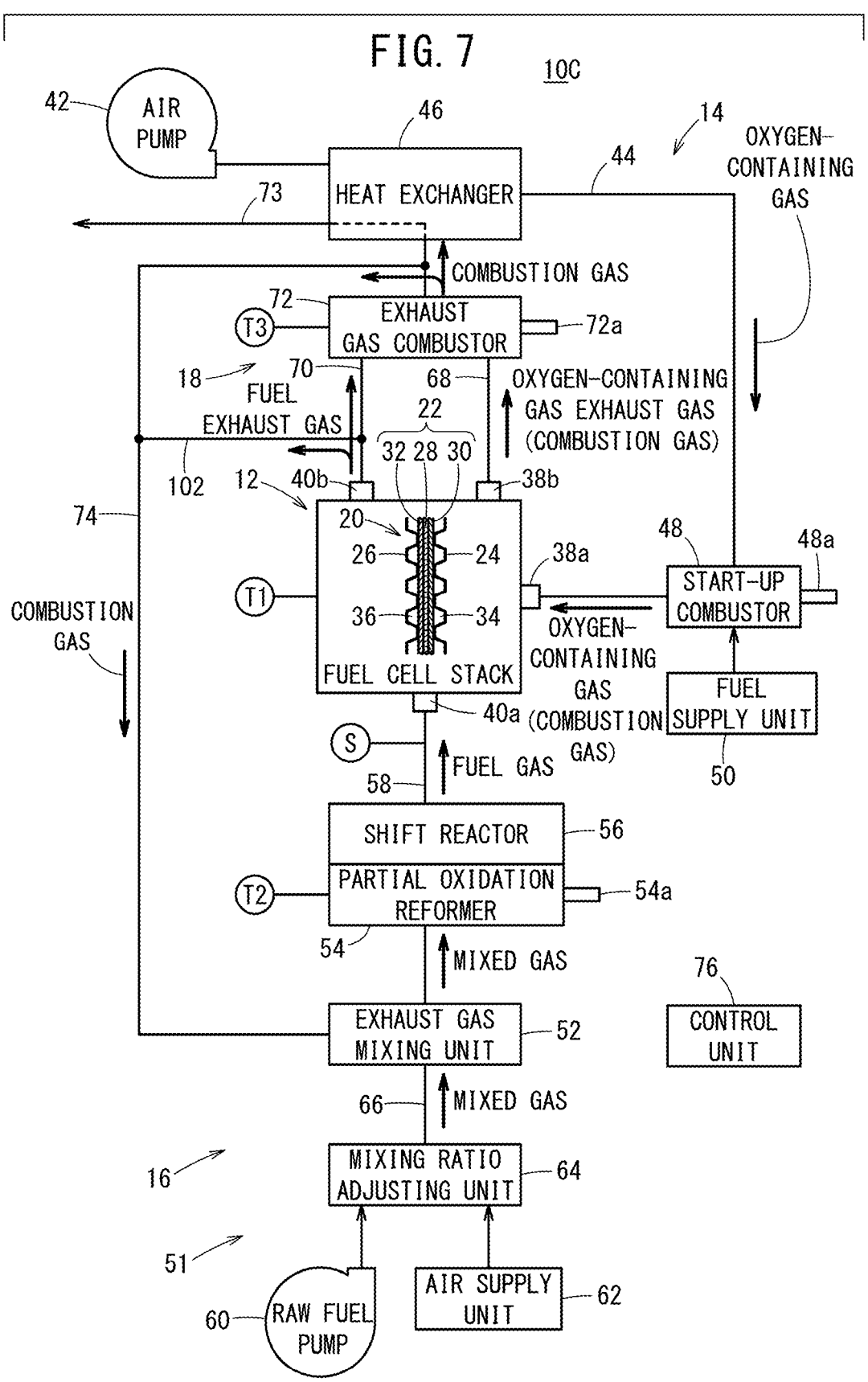

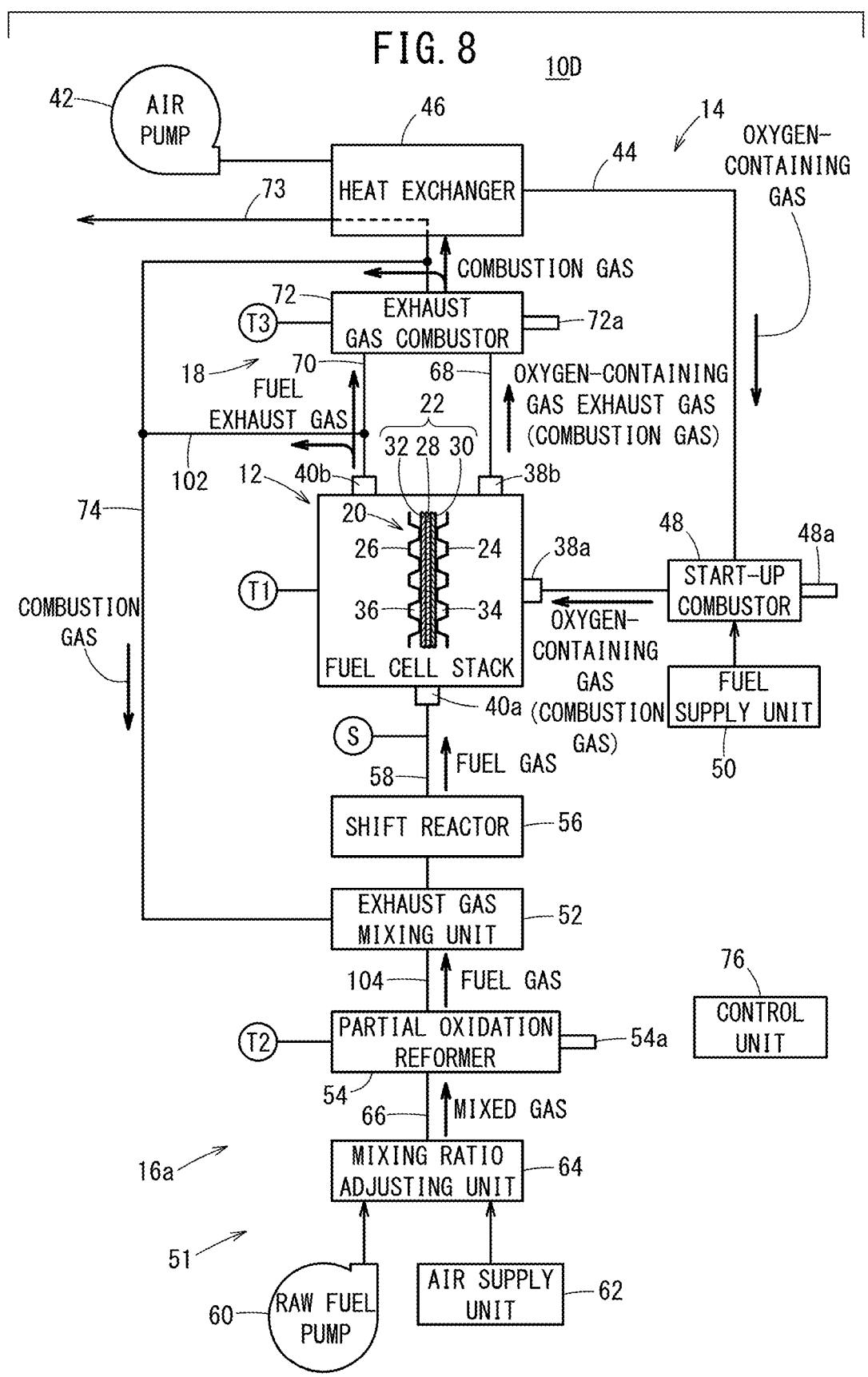

US 11,380,929 B2

FUEL CELL SYSTEM AND CONTROL METHOD THEREOF

CROSS-REFERENCE TO RELATED APPLICATION

This application is based upon and claims the benefit of priority from Japanese Patent Application No. 2018-117519 filed on Jun. 21, 2018, the contents of which are incorporated herein by reference.

BACKGROUND OF THE INVENTION

Field of the Invention

The present invention relates to a fuel cell system having a partial oxidation reformer, and a control method thereof.

Description of the Related Art

For example, Japanese Laid-Open Patent Publication No. 2017-183249 discloses a fuel cell system having a partial oxidation reformer that produces a fuel gas by partially oxidizing a raw fuel, and a fuel cell that generates electric power by an electrochemical reaction between the fuel gas produced in the partial oxidation reformer and an oxygen-containing gas.

SUMMARY OF THE INVENTION

The fuel gas produced in the partial oxidation reformer contains a relatively large amount of CO (carbon monoxide). Consequently, carbon (C) may deposit in fuel cells according to the following reaction equation (so-called Boudouard reaction).

$$2CO \leftrightarrow CO_2 + C$$

The present invention has been devised considering such a problem, and an object of the present invention is to provide a fuel cell system and a control method thereof that are capable of suppressing carbon deposition in a fuel cell.

According to an aspect of the present invention, a fuel cell system includes: a partial oxidation reformer that reforms a raw fuel into a fuel gas by subjecting the raw fuel to partial oxidation reforming; a fuel cell that generates electric power by an electrochemical reaction of the fuel gas produced in the partial oxidation reformer and an oxygen-containing gas; a CO sensor configured to detect a CO concentration in the fuel gas produced in the partial oxidation reformer and introduced into the fuel cell; a mixing ratio adjusting unit configured to adjust a mixing ratio of the raw fuel and air supplied to the partial oxidation reformer; a target CO concentration setting unit configured to set a target CO concentration in the fuel gas introduced into the fuel cell; and a mixing control unit configured to control operation of the mixing ratio adjusting unit such that the CO concentration detected by the CO sensor becomes the target CO concentration.

Another aspect of the present invention is directed to a method of controlling a fuel cell system including: a partial oxidation reformer that reforms a raw fuel into a fuel gas by subjecting the raw fuel to partial oxidation reforming; a fuel cell that generates electric power by an electrochemical reaction of the fuel gas produced in the partial oxidation reformer and an oxygen-containing gas; a CO sensor configured to detect a CO concentration in the fuel gas produced in the partial oxidation reformer and introduced into the fuel cell; and a mixing ratio adjusting unit configured to adjust a mixing ratio of the raw fuel and air supplied to the partial oxidation reformer. The fuel cell system control method includes: a target CO concentration setting step of setting a target CO concentration in the fuel gas introduced into the fuel cell; and a mixing control step of controlling operation of the mixing ratio adjusting unit such that the CO concentration detected by the CO sensor becomes the target CO concentration.

According to this invention, the mixing ratio of the raw fuel and air supplied to the partial oxidation reformer is adjusted such that the CO concentration detected by the CO sensor becomes a target CO concentration, whereby the CO concentration in the fuel gas supplied to the fuel cell can be suppressed appropriately. This suppresses carbon deposition at the fuel cell.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 3A is an explanatory diagram illustrating reforming maps used during startup, FIG. 3B is an explanatory diagram illustrating reforming maps used during power generation;

FIG. 4 is a first flowchart illustrating a method of controlling the fuel cell system of FIG. 1;

FIG. 5 is a second flowchart illustrating the method of controlling the fuel cell system of FIG. 1;

FIG. 6 is a schematic configuration explanatory diagram showing a fuel cell system according to a second embodiment of the present invention;

FIG. 7 is a schematic configuration explanatory diagram showing a fuel cell system according to a third embodiment of the present invention; and FIG. 8 is a schematic configuration explanatory diagram showing a fuel cell system according to a fourth embodiment of the present invention.

DESCRIPTION OF THE PREFERRED EMBODIMENTS

The fuel cell system and control method thereof according to the present invention will now be described in conjunction with preferred embodiments while referring to the accompanying drawings.

First Embodiment

Figure 1:
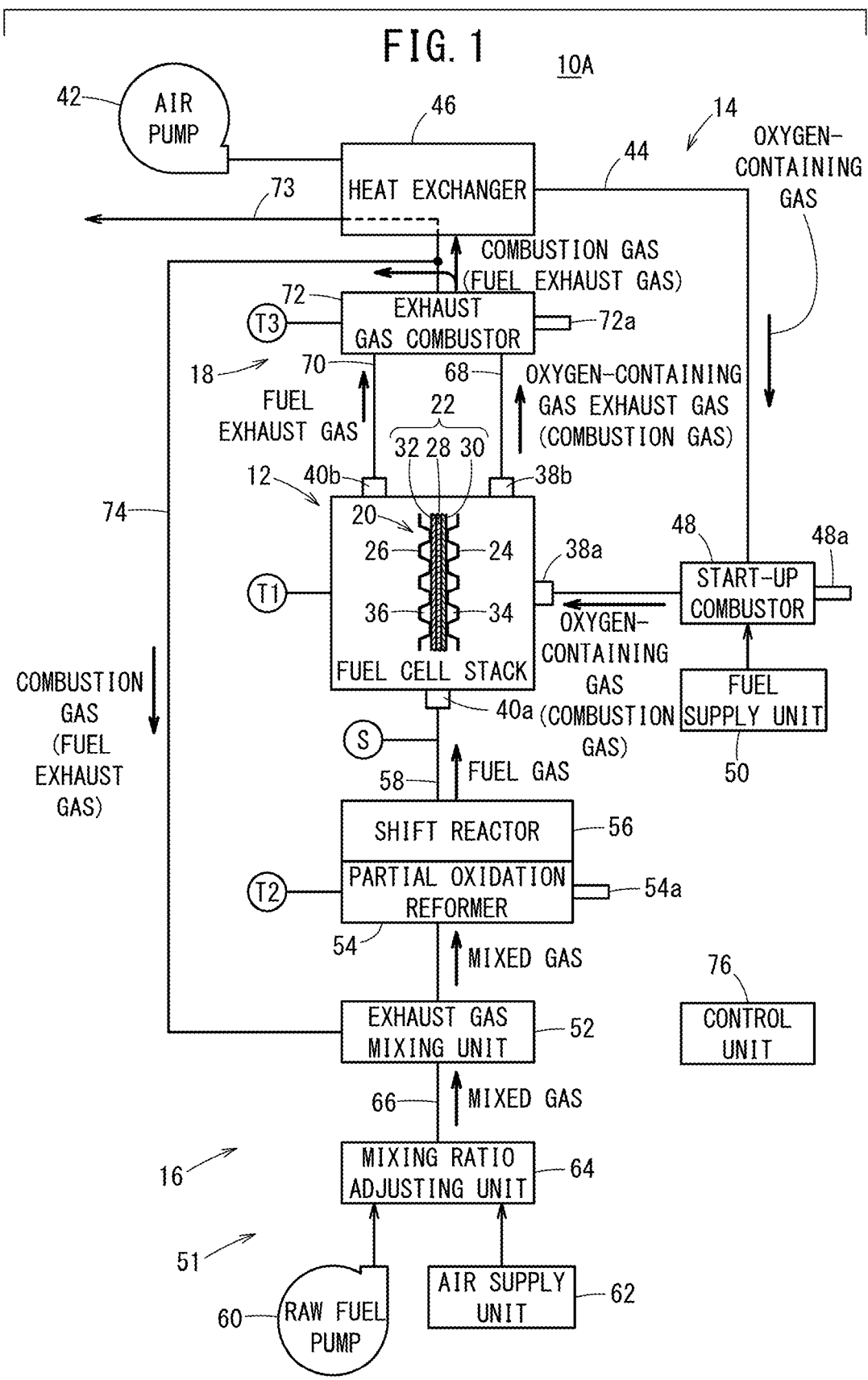
FIG. 1 is a schematic configuration explanatory diagram of a fuel cell system according to a first embodiment of the present invention.

As shown in FIG. 1, a fuel cell system 10A according to this embodiment is used for a variety of applications from stationary use to onboard use. The fuel cell system 10A can also be used as a so-called portable power generator.

The fuel cell system 10A includes a fuel cell stack 12 as a fuel cell, an oxygen-containing gas supply device 14, a fuel gas supply device 16, and a discharge device 18.

The fuel cell stack 12 includes a plurality of unit cells 20 stacked on one another, and a set of end plates (not shown) disposed at both ends of the direction in which the plurality of unit cells 20 are stacked. The fuel cell stack 12 is not limited to the example of planar stack type but may be of tubular type. The unit cells 20 are configured as solid oxide fuel cells (SOFCs) that generate electric power by an electrochemical reaction of fuel gas (hydrogen gas) and oxygen-containing gas (air).

Each unit cell 20 includes an electrolyte electrode assembly 22, and a cathode separator 24 and an anode separator 26 that sandwich the electrolyte electrode assembly 22. The cathode separator 24 and the anode separator 26 may be configured as a two-sided bipolar separator. The electrolyte electrode assembly 22 includes a sheet-like electrolyte 28, a cathode 30 provided on one surface of the electrolyte 28, and an anode 32 provided on the other surface of the electrolyte 28. The electrolyte 28 is made of an oxide ion conductor such as stabilized zirconia, for example.

The surface of the cathode separator 24 that faces the cathode 30 has an oxygen-containing gas flow field 34 formed therein. The surface of the anode separator 26 that faces the anode 32 has a fuel gas flow field 36 formed therein.

The fuel cell stack 12 has an oxygen-containing gas inlet 38a, an oxygen-containing gas outlet 38b, a fuel gas inlet 40a, and a fuel gas outlet 40b. The oxygen-containing gas inlet 38a passes through each unit cell 20 in the stacking direction and communicates with the supply side of the oxygen-containing gas flow field 34. The oxygen-containing gas outlet 38b passes through each unit cell 20 in the stacking direction and communicates with the discharge side of the oxygen-containing gas flow field 34. The oxygen-containing gas flow field 34, the oxygen-containing gas inlet 38a, and the oxygen-containing gas outlet 38b constitute a cathode flow field.

The fuel gas inlet 40a passes through each unit cell 20 in the stacking direction and communicates with the supply side of the fuel gas flow field 36. The fuel gas outlet 40b passes through each unit cell 20 in the stacking direction and communicates with the discharge side of the fuel gas flow field 36. The fuel gas flow field 36, the fuel gas inlet 40a, and the fuel gas outlet 40b constitute an anode flow field.

The oxygen-containing gas supply device 14 includes an air pump 42 and an oxygen-containing gas supply path 44. The oxygen-containing gas supply path 44 supplies an oxygen-containing gas (air) sent out from the air pump 42 to the oxygen-containing gas inlet 38a of the fuel cell stack 12. A heat exchanger 46 and a startup combustor 48 are disposed on the oxygen-containing gas supply path 44. The heat exchanger 46 heats the oxygen-containing gas by effecting heat exchange between the oxygen-containing gas and a combustion gas that is guided from an exhaust gas combustor 72 that will be described later.

The startup combustor 48 is provided on the oxygen-containing gas supply path 44 in the vicinity of the oxygen-containing gas inlet 38a of the fuel cell stack 12. Alternatively, the startup combustor 48 may be provided directly to the oxygen-containing gas inlet 38a. The startup combustor 48 combusts the oxygen-containing gas and a fuel supplied from a fuel supply unit 50 at the time of startup of the fuel cell stack 12 and thereby produces a combustion gas. The startup combustor 48 includes an ignition device 48a such as an igniter. The fuel supply unit 50 is configured as a fuel pump, for example. However, the fuel used in the startup combustor 48 may be supplied from a raw fuel pump 60 of the fuel gas supply device 16.

The fuel gas supply device 16 includes a raw fuel supply device 51, an exhaust gas mixing unit 52, a partial oxidation reformer 54, a shift reactor 56, and a fuel gas supply path 58.

The raw fuel supply device 51 includes the raw fuel pump 60, an air supply unit 62, a mixing ratio adjusting unit 64, and a mixed gas supply path 66. The raw fuel pump 60 supplies a raw fuel mainly containing hydrocarbon (e.g. city gas) to the mixing ratio adjusting unit 64. The air supply unit 62 supplies air to the mixing ratio adjusting unit 64. The air supplied to the mixing ratio adjusting unit 64 may be supplied from the air pump 42 of the oxygen-containing gas supply device 14.

The mixing ratio adjusting unit 64 adjusts a mixing ratio of the raw fuel and air. The mixed gas supply path 66 guides the mixed gas of raw fuel and air to the partial oxidation reformer 54. The exhaust gas mixing unit 52 is disposed on the mixed gas supply path 66. The exhaust gas mixing unit 52 is an ejector that introduces into the mixed gas supply path 66, a combustion gas that is guided from a combustion gas introducing path 74 that will be described later. However, the exhaust gas mixing unit 52 is not limited to an ejector but may be a mixer or the like.

The partial oxidation reformer 54 performs partial oxidation reforming of the raw fuel containing hydrocarbon to produce a fuel gas that contains carbon monoxide and hydrogen gas etc. (reform gas). A partial oxidation reaction catalyst used in the partial oxidation reformer 54 may be Pt (platinum), Rh (rhodium), or Pd (palladium), or the like, for example. Temperatures around 500° C. to 1000° C. are desirable for the partial oxidation reformer 54. The partial oxidation reformer 54 includes an ignition device 54a such as an igniter.

The shift reactor 56 causes a shift reaction of the carbon monoxide in the fuel gas produced in the partial oxidation reformer 54 and water vapor to produce carbon dioxide and hydrogen gas. The shift reactor 56 is provided integrally with the partial oxidation reformer 54. However, the shift reactor 56 need not necessarily be provided integrally with the partial oxidation reformer 54 as long as it is continuous with the partial oxidation reformer 54. The fuel gas supply path 58 supplies the fuel gas from the shift reactor 56 to the fuel gas inlet 40a of the fuel cell stack 12.

The discharge device 18 includes an oxygen-containing gas discharge path 68, a fuel gas discharge path 70, an exhaust gas combustor 72, and a combustion gas send-out path 73.

The oxygen-containing gas discharge path 68 connects the oxygen-containing gas outlet 38b of the fuel cell stack 12 and the exhaust gas combustor 72 to each other. The oxygen-containing gas discharge path 68 guides, from the fuel cell stack 12 to the exhaust gas combustor 72, an oxygen-containing gas exhaust gas as oxygen-containing gas that has at least partially been used at the cathodes 30.

The fuel gas discharge path 70 connects the fuel gas outlet 40b of the fuel cell stack 12 and the exhaust gas combustor 72 to each other. The fuel gas discharge path 70 guides from the fuel cell stack 12 to the exhaust gas combustor 72 a fuel exhaust gas as fuel gas that has at least partially been used at the anodes 32.

The exhaust gas combustor 72 combusts the oxygen-containing gas exhaust gas guided from the oxygen-containing gas discharge path 68 and the fuel exhaust gas guided from the fuel gas discharge path 70 to produce a combustion gas. The exhaust gas combustor 72 includes an ignition device 72a such as an igniter. The exhaust gas combustor 72 may employ self-ignition of the oxygen-containing gas exhaust gas and fuel exhaust gas. The ignition device 72a can be omitted in this case.

The combustion gas send-out path 73 discharges the combustion gas guided from the exhaust gas combustor 72 into the atmosphere through the heat exchanger 46. One end of the combustion gas introducing path 74 is connected to the combustion gas send-out path 73 on the side upstream of the heat exchanger 46. The other end of the combustion gas introducing path 74 is connected to the exhaust gas mixing unit 52. The combustion gas introducing path 74 guides to the shift reactor 56, the combustion gas containing water vapor that was produced in the startup combustor 48 and went through the fuel cell stack 12.

The fuel cell system 10A further includes a fuel cell temperature detecting unit T1, a reformer temperature detecting unit T2, an exhaust gas combustor temperature detecting unit T3, a CO sensor S, and a control unit 76.

The fuel cell temperature detecting unit T1 detects a temperature of the fuel cell stack 12. The reformer temperature detecting unit T2 detects a temperature of the partial oxidation reformer 54. The exhaust gas combustor temperature detecting unit T3 detects a temperature of the exhaust gas combustor 72. The CO sensor S is disposed on the fuel gas supply path 58. The CO sensor S detects a CO concentration (carbon monoxide concentration) in the fuel gas flowing in the fuel gas supply path 58 (the fuel gas produced in the partial oxidation reformer 54).

The control unit 76 is a computer including a microcomputer, which is composed of a CPU (Central Processing Unit), ROM and RAM as memory, and so on. The control unit 76 functions as a various functions realizing unit (function realizing means) as the CPU reads and executes programs stored in the ROM. The various functions realizing unit may be composed of a function realizing device as hardware. The control unit 76 controls driving of the air pump 42, the raw fuel pump 60, and the air supply unit 62.

Figure 2:
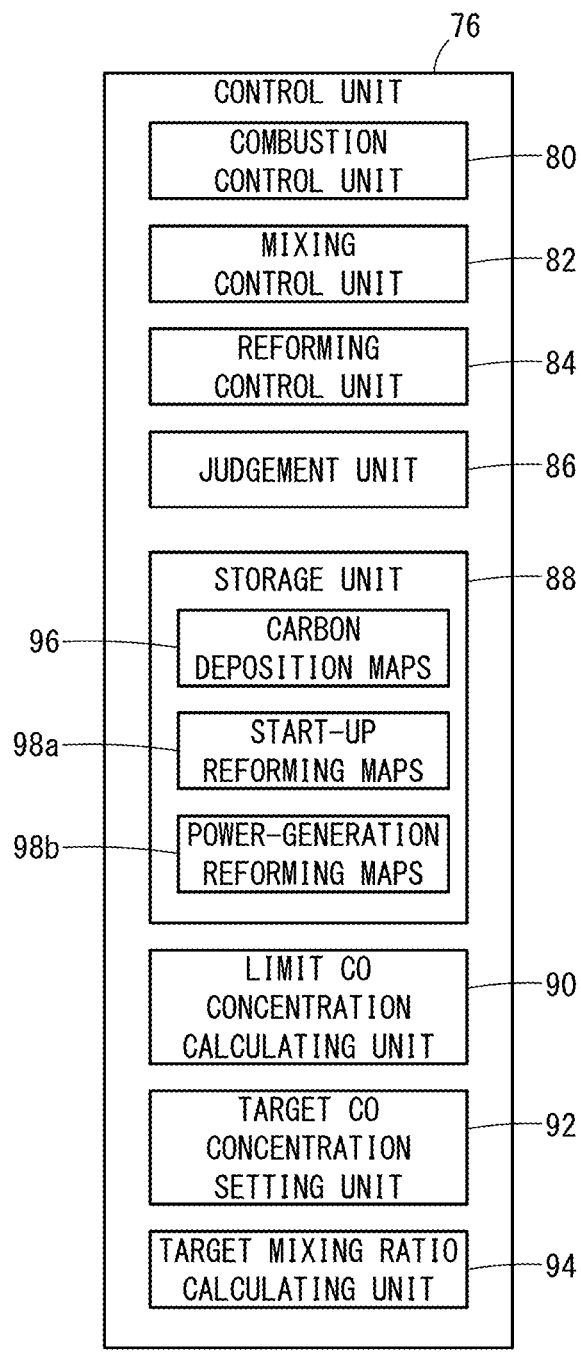
FIG. 2 is a block diagram of the control unit of FIG. 1.

As shown in FIG. 2, the control unit 76 includes a combustion control unit 80, a mixing control unit 82, a reforming control unit 84, a judgement unit 86, a storage unit 88, a limit CO concentration calculating unit 90, a target CO concentration setting unit 92, and a target mixing ratio calculating unit 94.

The combustion control unit 80 controls the supply of fuel from the fuel supply unit 50 to the startup combustor 48. The combustion control unit 80 also controls ignition of the ignition device 48a of the startup combustor 48 and ignition of the ignition device 72a of the exhaust gas combustor 72. The mixing control unit 82 controls driving of the mixing ratio adjusting unit 64. The reforming control unit 84 controls ignition of the ignition device 54a of the partial oxidation reformer 54. The judgement unit 86 judges whether the combustion gas produced in the startup combustor 48 has reached the shift reactor 56.

The storage unit 88 contains carbon deposition maps 96, start-up reforming maps 98a, and power-generation reforming maps 98b that are stored therein in advance. The carbon deposition maps 96 are maps that define relations between temperature of the fuel cell stack 12 and carbon deposition in the fuel cell stack 12. Specifically, graphs indicating variations of carbon deposition risk with respect to the temperature of the fuel cell stack 12 are used as the carbon deposition maps 96, for example. Multiple graphs are prepared for different compositions of the fuel gas (reform gas).

The start-up reforming maps 98a are maps that define relations among temperature of the partial oxidation reformer 54, CO concentration in the fuel gas produced in the partial oxidation reformer 54, and the mixing ratio of the raw fuel and air supplied to the partial oxidation reformer 54.

Specifically, as shown in FIG. 3A, multiple graphs (e.g. n graphs) for different mixing ratios (oxygen to carbon ratios: $O_2/C$) are used as the start-up reforming maps 98a. Each graph shows a variation of the CO concentration with respect to the temperature of the partial oxidation reformer 54. In other words, in each graph, the horizontal axis indicates the temperature of the partial oxidation reformer 54 and the vertical axis indicates the CO concentration.

As shown in FIG. 3A, in the start-up reforming maps 98a, for example, when the temperature of the partial oxidation reformer 54 is Ta, then the CO concentration is C1 when $O_2/C=\alpha 1$, and the CO concentration is Cn when $O_2/C=\alpha n$. In the example of FIG. 3A, αn is larger than α1, and Cn is smaller than C1. That is, in the start-up reforming maps 98a, when the temperature of the partial oxidation reformer 54 is constant, then the CO concentration decreases as the mixing ratio ($O_2/C$) becomes larger.

The power-generation reforming maps 98b are maps that define relations among the temperature of the partial oxidation reformer 54, the CO concentration in the fuel gas produced in the partial oxidation reformer 54, and the mixing ratio of raw fuel and air supplied to the partial oxidation reformer 54.

Specifically, as shown in FIG. 3B, multiple graphs (e.g. n graphs) for different mixing ratios (oxygen to carbon ratios: $O_2/C$) are used as the power-generation reforming maps 98b. Each graph shows a variation of the CO concentration with respect to the temperature of the partial oxidation reformer 54. In other words, in each graph, the horizontal axis indicates the temperature of the partial oxidation reformer 54 and the vertical axis indicates the CO concentration.

As shown in FIG. 3B, in the power-generation reforming maps 98b, for example, when the temperature of the partial oxidation reformer 54 is Ta, then the CO concentration is C1 when $O_2/C=\beta 1$, and the CO concentration is Cn when $O_2/C=\beta n$. In the example of FIG. 3B, βn is larger than β1, and Cn is smaller than C1. That is, in the power-generation reforming maps 98b, when the temperature of the partial oxidation reformer 54 is constant, then the CO concentration decreases as the mixing ratio ($O_2/C$) becomes larger. Note that β1 is smaller than α1 in the start-up reforming maps 98a.

In this embodiment, at startup of the fuel cell stack 12, water produced by power generation of the fuel cell stack 12 is not introduced into the shift reactor 56, and the water in the combustion gas produced in the startup combustor 48 is introduced into the shift reactor 56. On the other hand, during power generation of the fuel cell stack 12, water produced by the power generation is introduced into the shift reactor 56. That is, the amount of water introduced into the shift reactor 56 differs between during startup and during power generation of the fuel cell stack 12. Also, in accordance with the amount of water introduced into the shift reactor 56, the CO concentration in the fuel gas produced by the partial oxidation reformer 54 and the shift reactor 56 varies. Accordingly, this embodiment prepares the two kinds of reforming maps, including the start-up reforming maps 98a and the power-generation reforming maps 98b.

The start-up reforming maps 98a and the power-generation reforming maps 98b need not necessarily be such multiple graphs as shown in FIGS. 3A and 3B. For example, multiple graphs for different temperatures of the partial oxidation reformer 54 may be used as the start-up reforming maps 98a and the power-generation reforming maps 98b. In this case, in each graph, the horizontal axis indicates the mixing ratio ($O_2/C$) and the vertical axis indicates the CO concentration.

In FIG. 2, using the carbon deposition maps 96, the limit CO concentration calculating unit 90 calculates a limit CO concentration in the fuel gas at which carbon deposition to the fuel cell stack 12 begins. The target CO concentration setting unit 92 sets a target CO concentration in the fuel gas at a concentration smaller than the limit CO concentration. From the temperature detected at the reformer temperature detecting unit T2 and the target CO concentration, the target mixing ratio calculating unit 94 calculates a target mixing ratio (target $O_2/C$) of the raw fuel and air supplied to the partial oxidation reformer 54, by using the start-up reforming maps 98a or power-generation reforming maps 98b.

Next, a method of controlling the fuel cell system 10A will be described.

When starting the fuel cell system 10A, at step S1 in FIG. 4, the control unit 76 drives the air pump 42 to supply oxygen-containing gas to the oxygen-containing gas supply path 44. The oxygen-containing gas supplied from the air pump 42 to the oxygen-containing gas supply path 44 is guided to the startup combustor 48 through the heat exchanger 46.

At step S2, the control unit 76 drives the raw fuel pump 60 to supply raw fuel to the mixing ratio adjusting unit 64 and drives the air supply unit 62 to supply air to the mixing ratio adjusting unit 64. The raw fuel and air are mixed in the mixing ratio adjusting unit 64.

Subsequently, at step S3 (combustion step), the combustion control unit 80 starts combustion of the startup combustor 48. Specifically, the combustion control unit 80 starts the supply of fuel from the fuel supply unit 50 to the startup combustor 48 and ignites the ignition device 48a of the startup combustor 48.

Then, in the startup combustor 48, the oxygen-containing gas and fuel are mixed and ignited by the ignition device 48a, producing combustion gas. The combustion gas contains water vapor. The combustion gas produced in the startup combustor 48 is guided to the oxygen-containing gas outlet 38b through the oxygen-containing gas inlet 38a and the oxygen-containing gas flow fields 34 of the fuel cell stack 12. The temperature of the fuel cell stack 12 is thus raised.

The combustion gas sent out from the oxygen-containing gas outlet 38b of the fuel cell stack 12 is guided to the combustion gas send-out path 73 through the oxygen-containing gas discharge path 68 and the exhaust gas combustor 72. The combustion gas guided to the combustion gas send-out path 73 branches off to the combustion gas introducing path 74 on the side upstream of the heat exchanger 46. At the heat exchanger 46, heat of the combustion gas is transferred to the oxygen-containing gas flowing in the oxygen-containing gas supply path 44. The combustion gas having passed through the heat exchanger 46 is sent out to the combustion gas send-out path 73 on the downstream side of the heat exchanger 46. The combustion gas guided to the combustion gas introducing path 74 is guided to the exhaust gas mixing unit 52. The combustion gas introduced into the mixed gas in the exhaust gas mixing unit 52 is guided, together with the mixed gas, to the partial oxidation reformer 54 and the shift reactor 56 through the mixed gas supply path 66. The water vapor contained in the combustion gas is thus supplied to the shift reactor 56.

At this time, at step S4 (judgement step), the judgement unit 86 judges whether the combustion gas produced at the startup combustor 48 has reached the shift reactor 56. Specifically, the judgement unit 86 judges that the combustion gas has not reached the shift reactor 56 if temperature rise of the exhaust gas combustor 72 has not started, and judges that the combustion gas has reached the shift reactor 56 if temperature rise of the exhaust gas combustor 72 has started. Whether the temperature rise of the exhaust gas combustor 72 has started is judged by the judgement unit 86 based on the temperature detected at the exhaust gas combustor temperature detecting unit T3.

If the judgement unit 86 judges that the combustion gas has not reached the shift reactor 56 (step S4: NO), the processing of step S4 is repeated. If the judgement unit 86 judges that the combustion gas has reached the shift reactor 56 (step S4: YES), then, at step S5 (reforming step), the reforming control unit 84 ignites the ignition device 54a of the partial oxidation reformer 54.

In this way, in the partial oxidation reformer 54, the raw fuel is subjected to partial oxidation reforming to produce fuel gas (gas that contains carbon monoxide and hydrogen). The fuel gas produced in the partial oxidation reformer 54 is guided to the shift reactor 56.

Then, at step S6 (shift reaction step), the shift reactor 56 conducts a shift reaction of the carbon monoxide in the fuel gas and the water vapor in the combustion gas to produce carbon dioxide and hydrogen gas. The fuel gas (hydrogen gas etc.) sent out from the shift reactor 56 is guided from the fuel gas inlet 40a to the fuel gas flow fields 36.

The fuel gas produced in the partial oxidation reformer 54 is guided to the exhaust gas combustor 72 through the fuel cell stack 12 and the fuel gas discharge path 70. Then, at step S7 (exhaust gas combustion step), the combustion control unit 80 ignites the ignition device 72a of the exhaust gas combustor 72. The fuel gas guided to the exhaust gas combustor 72 is thus ignited and combustion gas is produced. The combustion gas produced in the exhaust gas combustor 72 is guided to the combustion gas introducing path 74 and the heat exchanger 46 through the combustion gas send-out path 73.

After the ignition device 54a of the partial oxidation reformer 54 has been started, then at step S8, a start-up carbon deposition suppressing control is performed. Specifically, at step S20 of FIG. 5 (fuel cell temperature detecting step), the fuel cell temperature detecting unit T1 detects a temperature of the fuel cell stack 12. Next, at step S21 (limit CO concentration calculating step), the limit CO concentration calculating unit 90 calculates the limit CO concentration using the temperature detected at the fuel cell temperature detecting unit T1 and the carbon deposition maps 96. That is, using the carbon deposition maps 96, the limit CO concentration calculating unit 90 calculates the limit CO concentration as a lowest limit value of the CO concentration at which carbon deposits in the fuel cell stack 12 at the temperature of the fuel cell stack 12 detected by the fuel cell temperature detecting unit T1.

Subsequently, at step S22 (reformer temperature detecting step), the reformer temperature detecting unit T2 detects a temperature of the partial oxidation reformer 54. Then, at step S23 (CO concentration detecting step), the CO sensor S detects the current CO concentration in the fuel gas flowing in the fuel gas supply path 58.

Subsequently, at step S24 (target CO concentration setting step), the target CO concentration setting unit 92 sets the target CO concentration at a highest CO concentration in a region lower than the limit CO concentration. However, the target CO concentration setting unit 92 may set the target CO concentration in any manner as long as it is within a range lower than the limit CO concentration.

Next, at step S25 (target mixing ratio calculating step), the target mixing ratio calculating unit 94 calculates the target mixing ratio using the temperature detected at the reformer temperature detecting unit T2, the target CO concentration, and the start-up reforming maps 98a. That is, in the example of FIG. 3A, if the partial oxidation reformer 54 is at the temperature Ta and the target CO concentration is Cn, then the target mixing ratio ($O_2/C$) calculated using the start-up reforming maps is αn.

Subsequently, at step S26 of FIG. 5 (mixing control step), the mixing control unit 82 controls operation of the mixing ratio adjusting unit 64 such that the CO concentration detected by the CO sensor S becomes the target CO concentration. That is, the mixing control unit 82 controls operation of the mixing ratio adjusting unit 64 such that the mixing ratio of the raw fuel and air becomes the target mixing ratio.

Subsequently, at step S9 in FIG. 4, the control unit 76 determines whether the startup of the fuel cell stack 12 has been completed.

If the control unit 76 determines that the startup of the fuel cell stack 12 is uncompleted (step S9: NO), the start-up carbon deposition suppressing control at step S8 is performed again.

If the control unit 76 determines that the startup of the fuel cell stack 12 has been completed (step S9: YES), then at step S10 (combustion stop step), the combustion control unit 80 stops the supply of fuel from the fuel supply unit 50 to the startup combustor 48.

Next, at step S11, power generation of the fuel cell stack 12 is started. That is, the oxygen-containing gas flowing in the oxygen-containing gas supply path 44 is supplied to the oxygen-containing gas inlet 38a of the fuel cell stack 12. The oxygen-containing gas is introduced from the oxygen-containing gas inlet 38a into the oxygen-containing gas flow fields 34 and moves along the oxygen-containing gas flow fields 34 to be supplied to the cathodes 30 of the electrolyte electrode assemblies 22.

On the other hand, the fuel gas flowing in the fuel gas supply path 58 is supplied to the fuel gas inlet 40a of the fuel cell stack 12. The fuel gas is introduced from the fuel gas inlet 40a into the fuel gas flow fields 36 and moves along the fuel gas flow fields 36 to be supplied to the anodes 32 of the electrolyte electrode assemblies 22.

Thus, in each electrolyte electrode assembly 22, the oxygen in the oxygen-containing gas supplied to the cathode 30 and the hydrogen gas in the fuel gas supplied to the anode 32 are consumed by the electrochemical reaction and power generation is started. Water is produced during the power generation.

The oxygen-containing gas supplied to and partially consumed at the cathode 30 is guided, as oxygen-containing gas exhaust gas, together with the water, to the exhaust gas combustor 72 through the oxygen-containing gas discharge path 68. The fuel gas supplied to and partially consumed at the anode 32 is guided, as fuel exhaust gas, together with the water, to the exhaust gas combustor 72 through the fuel gas discharge path 70.

Then, in the exhaust gas combustor 72, the oxygen-containing gas exhaust gas and the fuel exhaust gas are ignited and combustion gas is produced. The combustion gas produced in the exhaust gas combustor 72 is guided to the combustion gas introducing path 74 and the heat exchanger 46 through the combustion gas send-out path 73. At the heat exchanger 46, heat of the combustion gas is transferred to the oxygen-containing gas in the oxygen-containing gas supply path 44.

Part of the combustion gas that is guided into the combustion gas introducing path 74 from the combustion gas send-out path 73 at a side upstream of the heat exchanger 46 is guided to the fuel cell stack 12 through the exhaust gas mixing unit 52, partial oxidation reformer 54, shift reactor 56, and fuel gas supply path 58. That is, the water in the combustion gas guided to the combustion gas introducing path 74 is used in the shift reaction at the shift reactor 56. The remaining combustion gas that was not guided to the combustion gas introducing path 74 is discharged into the atmosphere through the combustion gas send-out path 73.

During the power generation of the fuel cell stack 12, at step S12, the power-generation carbon deposition suppressing control is performed. As shown in FIG. 5, the power-generation carbon deposition suppressing control includes a fuel cell temperature detecting step (step S30), a limit CO concentration calculating step (step S31), a reformer temperature detecting step (step S32), a CO concentration detecting step (step S33), a target CO concentration setting step (step S34), a target mixing ratio calculating step (step S35), and a mixing control step (step S36).

The power-generation carbon deposition suppressing control steps S30 to S34 and step S36 include the same processing as the start-up carbon deposition suppressing control steps S20 to S24 and step S26. At the target mixing ratio calculating step (step S35) of the power-generation carbon deposition suppressing control, the target mixing ratio calculating unit 94 calculates the target mixing ratio using the temperature detected at the reformer temperature detecting unit T2, the target CO concentration, and the power-generation reforming maps 98b. That is, the target mixing ratio calculating step of step S35 carries out the same processing as the above-described target mixing ratio calculating step of step S25, except that the power-generation reforming maps 98b are used in place of the start-up reforming maps 98a.

After the power-generation carbon deposition suppressing control (after step S36), then at step S13 of FIG. 4, the control unit 76 determines whether a power generation stop signal for the fuel cell stack 12 has been received. If the control unit 76 determines that the power generation stop signal for the fuel cell stack 12 has not been received (step S13: NO), the power-generation carbon deposition suppressing control at step S12 is performed again. If the control unit 76 determines the power generation stop signal for the fuel cell stack 12 has been received (step S13: YES), the control unit 76 then stops the power generation at step S14. The present flowchart thus ends.

The fuel cell system 10A and the control method of the fuel cell system 10A offer the following effects.

According to this embodiment, at startup of the fuel cell (fuel cell stack 12), it is possible to raise the temperature of the fuel cell (fuel cell stack 12) by the combustion gas produced in the startup combustor 48. It is also possible to cause a shift reaction using the water vapor in the combustion gas and thus the shift reactor 56 can efficiently reduce CO concentration in the fuel gas. It is thus possible to quickly start the fuel cell (fuel cell stack 12) while suppressing carbon deposition at the fuel cell (fuel cell stack 12).

The partial oxidation reformer 54 includes an ignition device 54a, and the fuel cell system 10A includes a reforming control unit 84 configured to control ignition of the ignition device 54a. At startup of the fuel cell (fuel cell stack 12), the reforming control unit 84 does not ignite the ignition device 54a until the combustion gas reaches the shift reactor 56, and ignites the ignition device 54a when the combustion gas has reached the shift reactor 56.

In the control method of the fuel cell system 10A, in the reforming step, at startup of the fuel cell (fuel cell stack 12), the ignition device 54a of the partial oxidation reformer 54 is not ignited until the combustion gas reaches the shift reactor 56, and the ignition device 54a is ignited when the combustion gas has reached the shift reactor 56.

The configuration and method above suppress formation of carbon monoxide in the partial oxidation reformer 54 before the combustion gas reaches the shift reactor 56 at startup of the fuel cell (fuel cell stack 12). This further suppresses carbon deposition in the fuel cell (fuel cell stack 12). Also, since the ignition device 54a is ignited when the combustion gas reaches the shift reactor 56, the partial oxidation reformer 54 can efficiently produce the fuel gas.

The fuel cell system 10A further includes: a fuel supply unit 50 configured to supply the fuel to the startup combustor 48; and a combustion control unit 80 configured to control the supply of the fuel from the fuel supply unit 50 to the startup combustor 48. The combustion control unit 80 is configured to continue the supply of the fuel from the fuel supply unit 50 to the startup combustor 48 until startup of the fuel cell stack 12 is completed, and to stop the supply of the fuel from the fuel supply unit 50 to the startup combustor 48 when the startup of the fuel cell stack 12 is completed.

In the method of controlling the fuel cell system 10A, in the combustion step, the supply of the fuel from the fuel supply unit 50 to the startup combustor 48 is continued until the startup of the fuel cell (fuel cell stack 12) is completed, and a combustion stop step of stopping the supply of the fuel from the fuel supply unit 50 to the startup combustor 48 is performed when the startup of the fuel cell (fuel cell stack 12) is completed.

According to the configuration and method, it is possible to start power generation of the fuel cell (fuel cell stack 12) immediately after the completion of startup of the fuel cell (fuel cell stack 12).

The fuel cell system 10A further includes: a combustion gas send-out path 73 to which the combustion gas passed through the fuel cell (fuel cell stack 12) is guided; and a heat exchanger 46 for transferring heat between the combustion gas flowing in the combustion gas send-out path 73 and the oxygen-containing gas flowing in the oxygen-containing gas supply path 44. The combustion gas introducing path 74 is connected to the combustion gas send-out path 73 on a side upstream of the heat exchanger 46.

According to the configuration, it is possible, at startup of the fuel cell (fuel cell stack 12) to efficiently heat the oxygen-containing gas by the combustion gas produced in the startup combustor 48.

The fuel cell system 10A further includes: a mixed gas supply path 66 for supplying a mixed gas of the raw fuel and an oxygen-containing gas to the partial oxidation reformer 54; and an exhaust gas mixing unit 52 disposed on the mixed gas supply path 66. The combustion gas introducing path 74 is connected to the exhaust gas mixing unit 52.

According to the configuration above, it is possible to guide the combustion gas to the shift reactor 56 by means of a simple configuration.

According to this embodiment, the mixing ratio of the raw fuel and air supplied to the partial oxidation reformer 54 is adjusted such that the CO concentration detected by the CO sensor S becomes a target CO concentration, whereby the CO concentration in the fuel gas supplied to the fuel cell (fuel cell stack 12) can be suppressed appropriately. This suppresses carbon deposition at the fuel cell (fuel cell stack 12).

The fuel cell system 10A includes: a fuel cell temperature detecting unit T1 configured to detect a temperature of the fuel cell (fuel cell stack 12); and a limit CO concentration calculating unit 90 configured to calculate, from the temperature detected by the fuel cell temperature detecting unit T1, a limit CO concentration in the fuel gas at which carbon deposition to the fuel cell (fuel cell stack 12) begins, by using a carbon deposition map 96 defining a relation between the temperature of the fuel cell (fuel cell stack 12) and the carbon deposition at the fuel cell (fuel cell stack 12). A target CO concentration setting unit 92 is configured to set a target CO concentration at a concentration lower than the limit CO concentration.

A method of controlling the fuel cell system 10A includes: a fuel cell temperature detecting step of detecting a temperature of the fuel cell (fuel cell stack 12); and a limit CO concentration calculating step of calculating, from the temperature detected at the fuel cell temperature detecting step, a limit CO concentration in the fuel gas at which carbon deposition to the fuel cell (fuel cell stack 12) begins, by using a carbon deposition map 96 defining a relation between the temperature of the fuel cell (fuel cell stack 12) and the carbon deposition at the fuel cell (fuel cell stack 12). A target CO concentration setting step sets a target CO concentration at a concentration lower than the limit CO concentration.

According to the configuration and method, it is possible to certainly suppress the carbon deposition in the fuel cell (fuel cell stack 12).

The fuel cell system 10A includes: a reformer temperature detecting unit T2 configured to detect a temperature of the partial oxidation reformer 54; and a target mixing ratio calculating unit 94 configured to calculate, from the temperature detected by the reformer temperature detecting unit T2 and the target CO concentration, a target mixing ratio of the raw fuel and air supplied to the partial oxidation reformer 54, by using a reforming map (power-generation reforming maps 98b) defining a relation among the temperature of the partial oxidation reformer 54, the CO concentration in the fuel gas produced in the partial oxidation reformer 54 and introduced into the fuel cell (fuel cell stack 12), and the mixing ratio. A mixing control unit 82 is configured to control operation of the mixing ratio adjusting unit 64 such that the mixing ratio becomes the target mixing ratio.

The method of controlling the fuel cell system 10A includes: a reformer temperature detecting step of detecting a temperature of the partial oxidation reformer 54; and a target mixing ratio calculating step of calculating, from the temperature detected at the reformer temperature detecting step and the target CO concentration, a target mixing ratio of the raw fuel and air supplied to the partial oxidation reformer 54, by using a reforming map (power-generation reforming maps 98b) defining a relation among the temperature of the partial oxidation reformer 54, the CO concentration in the fuel gas produced in the partial oxidation reformer 54 and introduced into the fuel cell (fuel cell stack 12), and the mixing ratio. A mixing control step controls operation of the mixing ratio adjusting unit 64 such that the mixing ratio becomes the target mixing ratio.

According to the configuration and method above, it is possible to accurately control the CO concentration in the fuel gas supplied to the fuel cell (fuel cell stack 12) to achieve the target CO concentration.

In the fuel cell system 10A, the target CO concentration setting unit 92 is configured to set the target CO concentration at a CO concentration that is highest in a region lower than the limit CO concentration. The target CO concentration setting step sets the target CO concentration at a CO concentration that is highest in a region lower than the limit CO concentration. According to the configuration and method, the power generation efficiency of the fuel cell (fuel cell stack 12) can be kept high.

The mixing control unit 82 is configured to control operation of the mixing ratio adjusting unit 64 such that the mixing ratio is adjusted by changing the amount of air supply with respect to the raw fuel. The mixing control step controls operation of the mixing ratio adjusting unit 64 such that the mixing ratio is adjusted by changing the amount of air supply with respect to the raw fuel. According to the configuration and method, the mixing ratio is adjusted without reducing the amount of raw fuel supply, which suppresses reduction in the amount of fuel component (hydrogen gas) in the fuel gas supplied to the fuel cell (fuel cell stack 12). This allows efficient operation of the fuel cell (fuel cell stack 12).

Second Embodiment

Next, a fuel cell system 10B according to a second embodiment of the present invention will be described. In the fuel cell system 10B of the second embodiment, the same constituent elements as those of the above-described fuel cell system 10A of the first embodiment are labeled using the same reference numerals and detailed descriptions thereof are not repeated. In the fuel cell system 10B of the second embodiment, the same constituent elements as those of the fuel cell system 10A of the first embodiment offer the same functions and effects. This also applies to third and fourth embodiments described later.

As shown in FIG. 6, the fuel cell system 10B of the second embodiment differs from the above-described fuel cell system 10A in that it includes a fuel exhaust gas circulation path 100 that connects the fuel gas discharge path 70 and the exhaust gas mixing unit 52. In this case, part of the fuel exhaust gas discharged from the fuel cell stack 12 to the fuel gas discharge path 70 is guided to the exhaust gas mixing unit 52 through the fuel exhaust gas circulation path 100 and reused in the fuel cell stack 12.

According to the configuration, the fuel exhaust gas can be used as fuel gas for the fuel cell (fuel cell stack 12) so that the power generation efficiency of the fuel cell (fuel cell stack 12) can be improved.

Third Embodiment

Next, a fuel cell system 10C according to a third embodiment will be described. In the fuel cell system 10C of the third embodiment, the same constituent elements as those of the above-described fuel cell system 10A of the first embodiment are labeled using the same reference numerals and detailed descriptions thereof are not repeated.

As shown in FIG. 7, the fuel cell system 10C of the third embodiment differs from the above-described fuel cell system 10A in that it includes a fuel exhaust gas circulation path 102 that connects the fuel gas discharge path 70 and the combustion gas introducing path 74. In this case, part of the fuel exhaust gas discharged from the fuel cell stack 12 to the fuel gas discharge path 70 is guided to the exhaust gas mixing unit 52 through the fuel exhaust gas circulation path 102 and the combustion gas introducing path 74, and reused in the fuel cell stack 12. This configuration offers the same effects as the second embodiment shown above.

Fourth Embodiment

Next, a fuel cell system 10D according to a fourth embodiment of the present invention will be described. In the fuel cell system 10D of the fourth embodiment, the same constituent elements as those of the above-described fuel cell system 10C of the third embodiment are labeled using the same reference numerals and detailed descriptions thereof are not repeated.

As shown in FIG. 8, a fuel gas supply device 16a of the fuel cell system 10D of the fourth embodiment includes an intermediate flow path 104 for guiding the fuel gas produced in the partial oxidation reformer 54 to the shift reactor 56, and an exhaust gas mixing unit 52 disposed on the intermediate flow path 104. That is, the partial oxidation reformer 54 is provided separately from the shift reactor 56. The combustion gas introducing path 74 is connected to the exhaust gas mixing unit 52.

In this invention, the configuration of the fourth embodiment (the configuration in which the exhaust gas mixing unit 52 is provided on the intermediate flow path 104 connecting the partial oxidation reformer 54 and the shift reactor 56) can of course be applied to the fuel cell systems 10A, 10B of the first and second embodiments.

The fuel cell system and control method thereof according to the present invention are not limited to the embodiments described above and various configurations are of course possible without departing from the essence and gist of the present invention.

What is claimed is:

1. A fuel cell system comprising:
    a partial oxidation reformer that reforms a raw fuel into a fuel gas by subjecting the raw fuel to partial oxidation reforming;
    a fuel cell that generates electric power by an electrochemical reaction of the fuel gas produced in the partial oxidation reformer and an oxygen-containing gas;
    a CO sensor configured to detect a CO concentration in the fuel gas produced in the partial oxidation reformer and introduced into the fuel cell;
    a mixing ratio adjusting unit configured to adjust a mixing ratio of the raw fuel and air supplied to the partial oxidation reformer;
    a target CO concentration setting unit configured to set a target CO concentration in the fuel gas introduced into the fuel cell;
    a fuel cell temperature detecting unit configured to detect a temperature of the fuel cell;
    a limit CO concentration calculating unit configured to calculate, based on the temperature detected by the fuel cell temperature detecting unit T1, a limit CO concentration in the fuel gas at which carbon deposition to the fuel cell begins, by using a carbon deposition map defining a relation between the temperature of the fuel cell and the carbon deposition at the fuel cell,
    wherein the target CO concentration setting unit is configured to set the target CO concentration at a concentration lower than the limit CO concentration; and
    a mixing control unit configured to control operation of the mixing ratio adjusting unit such that the CO concentration detected by the CO sensor becomes the target CO concentration.

2. The fuel cell system according to claim 1, further comprising:
    a reformer temperature detecting unit configured to detect a temperature of the partial oxidation reformer; and
    a target mixing ratio calculating unit configured to calculate, from the temperature detected by the reformer temperature detecting unit and the target CO concentration, a target mixing ratio of the raw fuel and air supplied to the partial oxidation reformer, by using a reforming map defining a relation among the temperature of the partial oxidation reformer, the CO concentration in the fuel gas produced in the partial oxidation reformer and introduced into the fuel cell, and the mixing ratio, wherein the mixing control unit is configured to control the operation of the mixing ratio adjusting unit such that the mixing ratio becomes the target mixing ratio.

3. The fuel cell system according to claim 1, wherein the target CO concentration setting unit is configured to set the target CO concentration at a CO concentration that is highest in a region lower than the limit CO concentration.

4. The fuel cell system according to claim 1, wherein the mixing control unit is configured to control the operation of the mixing ratio adjusting unit such that the mixing ratio is adjusted by changing an amount of air supply with respect to the raw fuel.

5. A method of controlling a fuel cell system, the fuel cell system comprising
- a partial oxidation reformer that reforms a raw fuel into a fuel gas by subjecting the raw fuel to partial oxidation reforming;
- a fuel cell that generates electric power by an electrochemical reaction of the fuel gas produced in the partial oxidation reformer and an oxygen-containing gas;
- a CO sensor configured to detect a CO concentration in the fuel gas produced in the partial oxidation reformer and introduced into the fuel cell;
- a mixing ratio adjusting unit configured to adjust a mixing ratio of the raw fuel and air supplied to the partial oxidation reformer, the fuel cell system control method comprising
- a target CO concentration setting step of setting a target CO concentration in the fuel gas introduced into the fuel cell,
- a fuel cell temperature detecting step of detecting a temperature of the fuel cell; and
- a limit CO concentration calculating step of calculating, from the temperature detected at the fuel cell temperature detecting step, a limit CO concentration in the fuel gas at which carbon deposition in the fuel cell begins, by using a carbon deposition map defining a relation between the temperature of the fuel cell and the carbon deposition at the fuel cell, wherein the target CO concentration setting step sets the target CO concentration at a concentration lower than the limit CO concentration, and a mixing control step of controlling operation of the mixing ratio adjusting unit such that the CO concentration detected by the CO sensor becomes the target CO concentration.

6. The fuel cell system control method according to claim 5, further comprising:
- a reformer temperature detecting step of detecting a temperature of the partial oxidation reformer; and
- a target mixing ratio calculating step of calculating, from the temperature detected at the reformer temperature detecting step and the target CO concentration, a target mixing ratio of the raw fuel and air supplied to the partial oxidation reformer, by using a reforming map defining a relation among the temperature of the partial oxidation reformer, the CO concentration in the fuel gas produced in the partial oxidation reformer and introduced into the fuel cell, and the mixing ratio, wherein the mixing control step controls the operation of the mixing ratio adjusting unit such that the mixing ratio becomes the target mixing ratio.

7. The fuel cell system control method according to claim 5, wherein the target CO concentration setting step sets the target CO concentration at a CO concentration that is highest in a region lower than the limit CO concentration.

8. The fuel cell system control method according to claim 5, wherein the mixing control step controls the operation of the mixing ratio adjusting unit such that the mixing ratio is adjusted by changing an amount of air supply with respect to the raw fuel.

* * * * *